United States Patent Office 2,816,090
Patented Dec. 10, 1957

2,816,090

PROCESS FOR PREPARING PHENOL-DICHLOROPHENOL-FORMALDEHYDE RESINS

George M. Wagner, Lewiston, N. Y., assignor to Olin Mathieson Chemical Corporation, a corporation of Virginia No Drawing. Application December 14, 1954,
Serial No. 475,288

3 Claims. (Cl. 260—53)

This invention relates to an improved process for the preparation of resinous compositions comprising aldehydes, phenol and mixed dichlorophenols. The new process is particularly adapted to the preparation of phenolic resins of the type described in co-pending application, Serial No. 475,278, filed December 14, 1954, of Burnett, Wagner and Soule. These resins, which are obtained initially in the form of first stage Novolak or Resol-type resins, depending upon whether an acidic or basic catalyst is employed, contain significant proportions of the reactive 2,5- and 2,3-dichlorophenol isomers and minor proportions of less reactive, e. g., 2,6- and 2,4-dichlorophenols. They are suitable for use in laminates, molding compositions, adhesive compositions, castings, surface coatings and similar applications, and are particularly valuable in that they are capable of being cured by means of an aldehyde to infusible third stage resins having a high chlorine content and excellent fire retardant properties.

Resins of this type comprise the condensation product of an aldehyde with a phenolic component comprising from about 15 to about 90 mole percent of phenol and about 85 to about 10 mole percent of the mixed dichlorophenols. Suitable mixed dichlorophenols comprise from about 50 to about 85 mole percent of 2,5-dichlorophenol and from about 10 to about 15 mole percent of 2,3-dichlorophenol; the combined total of the 2,5- and 2,3-dichlorophenol isomers being about 60–90 mole percent with the remainder of the mixture consisting principally of 2,6- and 2,4-dichlorophenols with or without minor proportions of other isomeric dichlorophenols and trichlorophenols. The resins are formed by reacting a reaction mixture consisting of the aldehyde and the phenolic components in the presence of a small amount of an acidic or basic catalyst for a period of time ranging from about 20 to 60 minutes depending, among other factors, on the ratio of phenol to dichlorophenol in the phenolic component. When an acid catalyst is employed it is neutralized by the addition of lime or other inorganic base after completion of the reaction. The aqueous layer is then separated from the reaction mixture and the resin dehydrated under vacuum at temperatures up to about 120° C.

Suitable aldehydes for use in the preparation of these resins include formaldehyde and furfuraldehyde as well as other aldehydes commonly employed in the preparation of phenolic resins. Formaldehyde is preferred and can be employed in any of its various forms such as 40 percent formalin or paraformaldehyde or in the form of formaldehyde-generating substances such as hexamethylenetetramine.

Mixed dichlorophenols suitable for use in the preparation of these resins can be readily obtained by a two-step process which comprises dehydrochlorinating waste benzene hexachloride isomers and hydrolyzing the resulting trichlorobenzenes to dichlorophenols as described in detail in copending Nicolaisen and Jenney application, Serial No. 389,163 filed October 10, 1953.

The ratio of aldehyde to phenol is usually from 0.8 to 0.9:1 for the acid catalyzed resins and 1.5 to 2.5:1 for the basic catalyzed resins. Suitable catalysts include 37 percent aqueous hydrochloric acid which is effective when used in amounts of about 0.5 percent by weight based on the total weight of aldehyde and phenolic component, formic and acetic acids which are effective in concentrations of about 1 to 4 percent by weight and 28 percent aqueous ammonia which is effective in amounts of about 1 percent by weight, as well as other acidic and basic catalysts commonly employed in the preparation of phenolic resins.

It has now been found that improved properties can be obtained in resins of the type described above by partially condensing a mixture comprising all of the mixed dichlorophenols and a part of the aldehyde with or without a portion of the phenol to be present in the finished resin, steaming the partially condensed reaction mixture to remove unreacted dichlorophenols and related products, adding phenol and aldehyde to the steamed reaction mixture in amounts sufficient to make up the proportions of aldehyde, phenol and mixed dichlorophenols desired in the final resins and completing the condensation reaction in the presence of an alkaline catalyst. Either an acidic or basic catalyst can be employed in the partial condensation step of the improved process. When an acidic catalyst is employed it is necessary to neutralize the excess acid prior to the addition of the basic catalyst for the completion of the condensation reaction or to add a sufficient excess of the basic catalyst to accomplish this result. Ordinarily, the partial condensation can be accomplished by reacting the reaction mixture for about 20 to 30 minutes. The steaming operation can be carried out in the same manner as an ordinary steam distillation or by any other suitable means. The aqueous layer is separated and the resin dehydrated by heating to a maximum temperature of about 120° C. for about 30 to 50 minutes under a pressure of 10 to 50 mm. of Hg.

The terms "less reactive chlorophenols" and "unreactive dichlorophenols" used herein connote chlorophenols which do not condense with aldehydes to form infusible third stage resins. Phenols condense with aldehydes on the para and both ortho positions. When one or more of these reactive positions is substituted by chlorine the resulting chlorophenol is insufficiently reactive to form an infusible resin with an aldehyde. The function of the phenol in the dichlorophenol resins described above is to dilute the amounts of these less reactive chlorophenols present in the mixed dichlorophenols and thus produce a phenolic component sufficiently reactive to form completely curable resins. The steaming operation of the process of this invention removes in substantial amount these less reactive chlorophenols, e. g., 2,4- and 2,6- dichlorophenol, trichlorophenols, and other unreactive or unreacted dichlorophenols.

The removal of unreacted dichlorophenols during the preparation of resins by the process of this invention reduces objectionable odors and the amount of acetone extractable material in the finished product. These desirable objectives have not previously seen easily attainable since it is difficult to separate the unreactive isomers from a mixture of dichlorophenols due to the closeness of the boiling points of the various isomers. The new process achieves the removal of these unreactive dichlorophenols from the resins without affecting any of the desirable properties of the resins. The second stage resins produced by this process are less viscous and, therefore, more readily incorporated in materials to be laminated than resins prepared solely from phenol and in addition cure under milder conditions in shorter periods of time to produce laminates outstanding in hardness and mechanical properties which are self-extinguishing without punking when ignited.

Example I

A partial condensate was prepared by allowing a mixture of 0.5 mole of mixed dichlorophenols, 0.25 mole of formalin, 18 grams of methanol and 720 grams of sulfuric acid to stand at 4 to 10° C. for 2 hours. The reaction mixture was poured over ice and 85 grams of a tan, semi-solid product was separated. This material was subjected to steam distillation and 11 grams of steam-distilled oil recovered. The residue was a light tan solid at room temperature. A resin was prepared by refluxing for 15 minutes a mixture of 34 grams of the partial condensate, 19 grams of phenol, 33 grams of 37 percent formalin, and 6 grams of 28 percent aqueous ammonia. The aqueous layer was separated and the resin was dehydrated by heating for about half an hour to a maximum temperature of 45° C. under a pressure of 20 mm.

A laminate was prepared by immersing sheets of a porous paper in the resin prepared above diluted with an equal weight of a mixture consisting of 90 percent by volume of ethanol and 10 percent by volume of toluene, removing the excess liquid and drying in air for 30 minutes. The dried sheets were stacked and placed in a cold press at 500 p. s. i. The plates were heated to 280 to 290° F. for 35 minutes and then cooled to a temperature of 100° F. The pressure was released and the laminate removed. The laminate was substantially self-extinguishing and non-punking when ignited and had good mechanical and other properties.

The mixed dichlorophenols used in this example had the following composition.

| Component | Percent by Weight |
| --- | --- |
| 2,5-Dichlorophenol | 66 |
| 2,3-Dichlorophenol | 14 |
| 2,6-Dichlorophenol | 12 |
| Other Dichlorophenol Isomers | 2 |
| Trichlorophenols | 6 |
| Total | 100 |

Other dichlorophenol mixtures containing a major proportion of the 2,5- and 2,3-isomers with minor amounts of the less reactive and unreactive chlorophenols can be employed in a similar manner in the present invention.

I claim:

1. A process for the preparation of resinous compositions comprising the formaldehyde condensation products of a phenolic component consisting essentially of about 15 to about 90 mole percent of phenol and about 85 to about 10 mole percent of mixed dichlorophenols, the mixed dichlorophenols comprising about 50 to about 85 mole percent of 2,5-dichlorophenol and about 10 to about 15 mole percent of 2,3-dichlorophenol, admixed with a minor proportion of 2,6- and 2,4-dichlorophenols in which all of the mixed dichlorophenols and a part of the aldehyde to be present in the composition are partially condensed, the partially condensed reaction mixture is steamed to remove unreacted dichlorophenol; phenol and aldehyde are added to the steamed reaction mixture in amounts sufficient to give the desired proportions in the composition and the condensation of the reaction mixture is completed in the presence of an alkaline catalyst.

2. In the process of preparing a resinous composition comprising the reaction product of formaldehyde and a mixture made up of 15–90 mole percent phenol and 85–10 mole percent dichlorophenols comprising a major proportion of the reactive 2,5- and 2,3-dichlorophenol isomers and a minor proportion of the less reactive 2,6- and 2,4-dichlorophenol isomers, the improvement which comprises initially reacting the mixture of the dichlorophenols with formaldehyde, steam distilling the resulting reaction product and then reacting the steam distilled reaction product with phenol and formaldehyde.

3. In the process of preparing a resinous composition comprising the reaction product of formaldehyde, and a mixture made up of 15–90 mole percent phenol and 85–10 percent dichlorophenols comprising about 65 mole percent 2,5-dichlorophenol, about 14 mole percent 2,3-dichlorophenol and about 12 mole percent 2,6-dichlorophenol, the improvement which comprises initially reacting the mixtures of dichlorophenols with a formaldehyde, steam distilling the reaction product and then reacting the steam distilled reaction product with phenol and additional formaldehyde.

References Cited in the file of this patent

UNITED STATES PATENTS 1,215,072     Steinmetz     Feb. 6, 1917

FOREIGN PATENTS 330,894     Great Britain     June 6, 1930